United States Patent
Sanford et al.

(10) Patent No.: US 12,212,070 B2
(45) Date of Patent: Jan. 28, 2025

(54) ORTHOGONALLY-POLARIZED ANTENNA SYSTEM AND DEVICE FOR MIMO APPLICATIONS

(71) Applicant: Mimosa Networks, Inc., Santa Clara, CA (US)

(72) Inventors: John Sanford, Escondido, CA (US); Brian L. Hinman, Los Gatos, CA (US); Justin Lee, Santa Clara, CA (US); Carlos Ramos, San Jose, CA (US); Syed Aon Mujtaba, Santa Clara, CA (US)

(73) Assignee: Mimosa Networks, Inc., Santa Clara, CA (US)

( * ) Notice: Subject to any disclaimer, the term of this patent is extended or adjusted under 35 U.S.C. 154(b) by 0 days.

(21) Appl. No.: 18/420,616

(22) Filed: Jan. 23, 2024

(65) Prior Publication Data

US 2024/0170856 A1  May 23, 2024

Related U.S. Application Data

(63) Continuation of application No. 18/107,453, filed on Feb. 8, 2023, now Pat. No. 11,936,114, which is a
(Continued)

(51) Int. Cl.
*H01Q 21/20* (2006.01)
*H01Q 9/04* (2006.01)
(Continued)

(52) U.S. Cl.
CPC ......... *H01Q 21/205* (2013.01); *H01Q 9/0428* (2013.01); *H01Q 21/26* (2013.01); *H04B 7/0413* (2013.01); *H04B 7/10* (2013.01)

(58) Field of Classification Search
CPC ........... H01Q 3/40; H01Q 1/246; H01Q 5/30; H01Q 15/242; H01Q 3/26; H01Q 13/24;
(Continued)

(56) References Cited

U.S. PATENT DOCUMENTS

| | | | |
|---|---|---|---|
| 2,115,761 | A | 5/1938 | Dower |
| 5,285,211 | A | 2/1994 | Herper et al. |

(Continued)

OTHER PUBLICATIONS

Illustration of Ubiquiti Networks airMax® Antenna; from Sanford, John et al., "Omni-Directional Orthogonally-Polarized Antenna System for MIMO Applications," U.S. Appl. No. 62/637,971, filed Mar. 2, 2018, Drawings, 1 page.
(Continued)

*Primary Examiner* — Monica C King
(74) *Attorney, Agent, or Firm* — Carr & Ferrell LLP

(57) ABSTRACT

Omni-directional orthogonally-polarized antenna system for MIMO applications are disclosed herein. An example antenna system comprises two arrays of horizontally polarized radiating elements, and two arrays of vertically polarized radiating elements, each array having roughly 180-degree radiation pattern, disposed about a central axis in a common horizontal plane, arrays of common polarization separated by 180-degrees. Also, the example antenna system includes at least one printed circuit board having a saw tooth pattern, wherein uniform coverage in both vertical and horizontal polarization over 360 degrees is provided using beamforming and polarization diversity.

20 Claims, 7 Drawing Sheets

Related U.S. Application Data continuation of application No. 17/827,360, filed on May 27, 2022, now Pat. No. 11,637,384, which is a continuation of application No. 17/323,679, filed on May 18, 2021, now Pat. No. 11,404,796, which is a continuation of application No. 16/284,121, filed on Feb. 25, 2019, now Pat. No. 11,069,986.

(60) Provisional application No. 62/637,971, filed on Mar. 2, 2018.

(51) Int. Cl.
*H01Q 21/26* (2006.01)
*H04B 7/0413* (2017.01)
*H04B 7/10* (2017.01)

(58) Field of Classification Search
CPC ...... H01Q 19/08; H01Q 25/00; H01Q 19/132; H01Q 21/064; H01Q 21/205; H01Q 21/067; H01Q 3/08; H01Q 1/42; H01Q 21/24; H01Q 21/26; H01Q 21/28; H01Q 9/0428
See application file for complete search history.

(56) References Cited

U.S. PATENT DOCUMENTS

| | | | |
|---|---|---|---|
| 5,600,338 A | 2/1997 | Ecklund et al. | |
| 6,057,804 A | 5/2000 | Kaegebein | |
| 9,461,368 B2 | 10/2016 | Azulay et al. | |
| 10,244,408 B1 | 3/2019 | Vannucci et al. | |
| 10,256,551 B2 | 4/2019 | Shehan et al. | |
| 10,381,716 B2 | 8/2019 | Matitsine et al. | |
| 10,686,497 B2 | 6/2020 | Apostolos et al. | |
| 11,069,986 B2 | 7/2021 | Sanford et al. | |
| 11,404,796 B2 | 8/2022 | Sanford et al. | |
| 11,637,384 B2 | 4/2023 | Sanford et al. | |
| 11,936,114 B2 | 3/2024 | Sanford et al. | |
| 2007/0202809 A1 | 8/2007 | Lastinger et al. | |
| 2009/0096699 A1 | 4/2009 | Chiu et al. | |
| 2011/0090129 A1 | 4/2011 | Weily et al. | |
| 2014/0253378 A1 | 9/2014 | Hinman | |
| 2015/0116177 A1 | 4/2015 | Powell et al. | |
| 2018/0035317 A1 | 2/2018 | Hinman et al. | |
| 2018/0167105 A1 | 6/2018 | Vannucci et al. | |
| 2019/0182686 A1 | 6/2019 | Hinman et al. | |
| 2019/0214699 A1 | 7/2019 | Eberhardt et al. | |
| 2019/0273326 A1 | 9/2019 | Sanford et al. | |
| 2021/0273346 A1 | 9/2021 | Sanford et al. | |
| 2022/0285855 A1 | 9/2022 | Sanford et al. | |
| 2023/0187846 A1 | 6/2023 | Sanford et al. | |

OTHER PUBLICATIONS

Illustration of Cisco Aironet 1552S Outdoor WI-Fi Access Point; from Sanford, John et al., "Omni-Directional Orthogonally-Polarized Antenna System for MIMO Applications," U.S. Appl. No. 62/637,971, filed Mar. 2, 2018, Drawings, 1 page.

ORTHOGONALLY-POLARIZED ANTENNA SYSTEM AND DEVICE FOR MIMO APPLICATIONS

CROSS-REFERENCE(S) TO RELATED APPLICATION(S)

This application is a continuation of U.S. patent application Ser. No. 18/107,453, filed on Feb. 8, 2023, now U.S. Pat. No. 11,936,114 issued on Mar. 19, 2024, which is a continuation of U.S. patent application Ser. No. 17/827,360, filed on May 27, 2022, now U.S. Pat. No. 11,637,384 issued on Apr. 25, 2023, which is a continuation of U.S. patent application Ser. No. 17/323,679, filed on May 18, 2021, now U.S. Pat. No. 11,404,796 issued on Aug. 2, 2022, which is a continuation of U.S. patent application Ser. No. 16/284,121, filed on Feb. 25, 2019, now U.S. Pat. No. 11,069,986 issued on Jul. 20, 2021, which claims the benefit and priority of U.S. Provisional Application Ser. No. 62/637,971, filed on Mar. 2, 2018, all of which are hereby incorporated by reference herein in their entirety including all references and appendices cited therein, for all purposes.

FIELD OF INVENTION

Embodiments of the present disclosure relate to antenna systems, and more specifically, to omni-directional orthogonally-polarized antenna systems for Multiple Inputs and Multiple Outputs (MIMO) applications.

BACKGROUND

For context, a common and classical omni-directional antenna is what is referred to as a half-wave dipole. When oriented vertically, it produces an omni-directional pattern in the azimuth plane, while the half-power beamwidth in the elevation plane is approximately 78 degrees.

For fixed wireless access (FWA) applications, an associated access point (or base station) has to transmit its signal omni-directionally in the azimuth plane, but the beamwidth can afford to be narrow in the elevation plane, thereby allowing the gain of the antenna to be increased.

Some omni-directional antennas have a narrow beamwidth in the elevation plane that is a produced by vertically stacking an array of dipole antennas, fed in a series arrangement from bottom of the array. These designs are representative of a "coaxial-collinear" array, as first described by Blumlein in 1935 (U.S. Pat. No. 2,115,761A). Many derivative designs have been described through the years, including Herber et al (U.S. Pat. No. 5,285,211A) and Ecklund et al (U.S. Pat. No. 5,600,338A). A coaxial collinear design suffers from various performance deficiencies. For example, a series arrangement of the antenna elements makes the array frequency dependent. As the proper phase of the elements occurs at a particular mid-band frequency, the array will tend to steer up or down in elevation angle as the frequency deviates from mid-band.

A coaxial, collinear array produces a vertically polarized signal, whereas modern communication systems exploit two antenna polarizations so as to double the capacity for a given amount of spectrum.

To address the narrow-band nature of series-fed antenna arrays, a number of solutions have employed a feed network which matches a time delay to each antenna element in what is typically called a "corporate feed" configuration. Kaegebein described such a system (U.S. Pat. No. 6,057,804A) for a vertical arrangement of dipoles. For sector antennas, such as those used in outdoor tower-deployed cellular applications, corporate fed arrangements of vertically disposed antenna elements is known.

To address the need for dual-polarization operation, some antennas comprise a line of dual-polarization omni-directional antennas. Some designs comprise multiple bands, including the 2.4 GHz and 5 GHz Wi-Fi bands. As with coaxial-collinear antenna designs, some omni-directional antennas employ a series-fed arrangement of antenna elements, resulting in an undesirable elevation steering over frequency.

Some radios employ multiple inputs and multiple outputs (MIMO). While only two streams of information can be carried over two antenna polarizations, additional antennas in a MIMO system allow incremental antenna gain through a technique known as "beamforming." As a generalization, each doubling of antennas within a polarization allows 3 dB greater gain than is possible with a single array. Current methods of achieving beamforming gain with omnidirectional antennas involve the use of multiple antennas, each mounted vertically, and being disposed in an arrangement occupying more space than a single antenna.

SUMMARY

According to some embodiments, the present disclosure is directed to an antenna system comprising two arrays of horizontally polarized radiating elements, and two arrays of vertically polarized radiating elements, each array having roughly 180-degree radiation pattern, disposed about a central axis in a common horizontal plane, arrays of common polarization separated by 180-degrees, such that MIMO processing of the signals to arrays of common polarization results in a radiation pattern that is substantially constant over 360-degrees in azimuth.

According to some embodiments, the present disclosure is directed to a device, comprising: a cylindrical radome housing; and an antenna system located within the cylindrical radome housing, the antenna system comprising a core assembly comprising two tubular metal extrusions, the two tubular metal extrusions enclosing slot arrays comprising a first pair of printed circuit boards each having slot elements that are horizontally polarized, the antenna system further comprising dipole arrays comprising a second pair of printed circuit boards each having dipole elements that are vertically polarized, the second pair of printed circuit boards being positioned between the two tubular metal extrusions, wherein the slot arrays and the dipole arrays cooperatively emit a radiation pattern that is substantially constant over 360-degrees in azimuth.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

High-gain, omni-directional antennas are desirable for a wide range of applications, as higher gain helps improve radio frequency (RF) link performance and reliability. Antenna gain can be increased by reducing beamwidth in either the elevation plane, the azimuth plane, or both planes in combination. It will be understood that in general, the narrower the beamwidth, the higher the gain of the antenna. In general, the present disclosure involves omni-directional orthogonally-polarized antenna systems for MIMO applications. The present disclosure provides several advantages over current and previous technologies referenced above, which will become readily apparent throughout this disclosure.

In one or more embodiments, the present disclosure is directed to a vertically oriented antenna system providing a complete 360 degree radiation pattern in the azimuth plane. The antenna system comprises two arrays of horizontally polarized radiating elements and two arrays of vertically polarized radiating elements. In various embodiments, each array pair produces an approximately 180-degree radiation pattern. In some embodiments, some radiating elements are disposed about a central axis in a common horizontal plane. In certain embodiments, arrays of common polarization can be separated by 180-degrees such that MIMO processing of signals to arrays of common polarization results in a radiation pattern that is substantially constant over 360-degrees in an azimuth plane.

Figure 1:
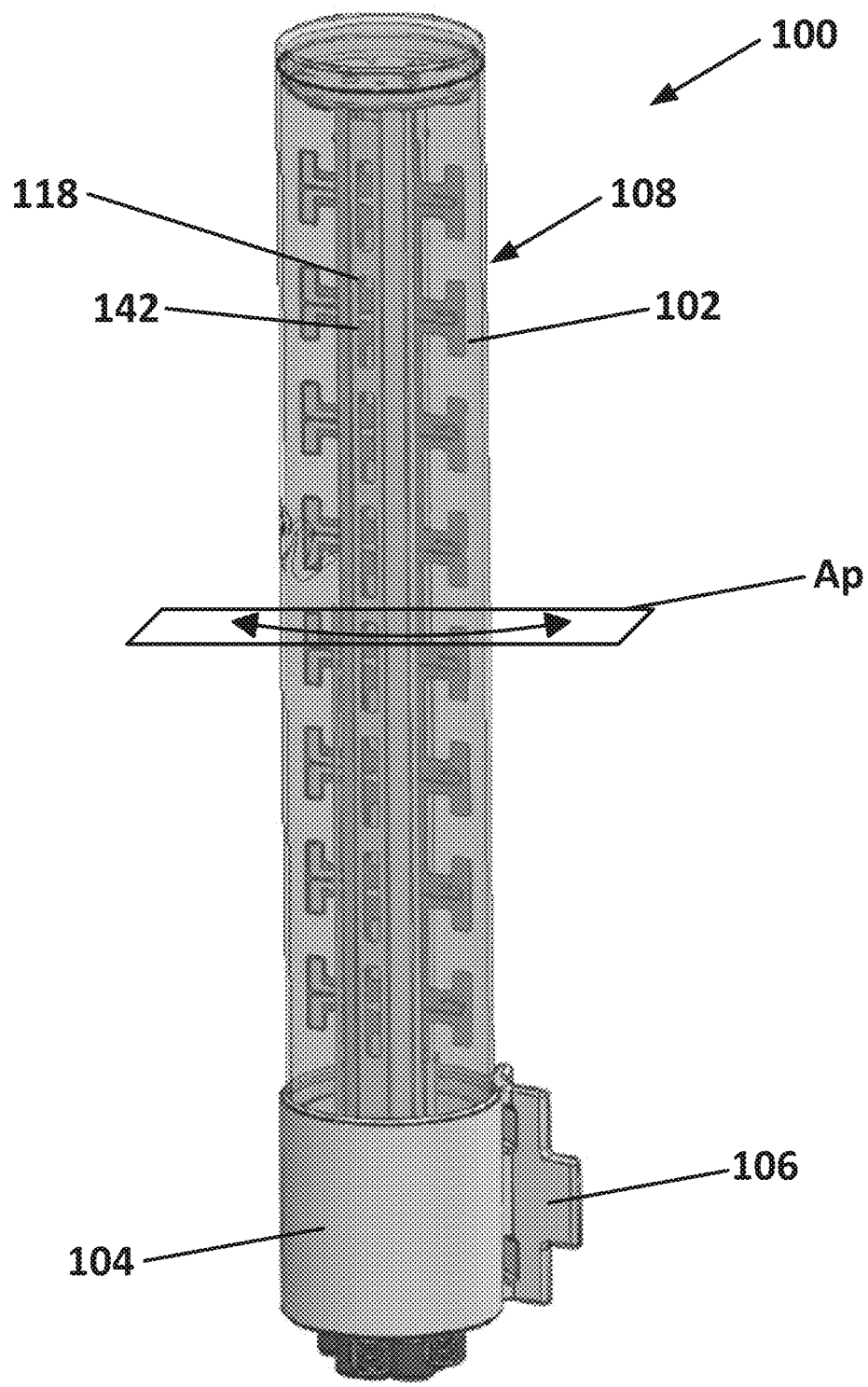
FIG. 1 is a perspective view of an example antenna system of the present disclosure.

As illustrated in FIG. 1, an example antenna system (hereinafter antenna system 100) comprises a radome housing 102 having a base 104 and a mounting plate 106. The antenna system 100 can be mounted in a vertical direction against a subordinate surface, such as a pole (no illustrated) using the mounting plate 106. This orients the antenna system 100 substantially perpendicularly or orthogonal to the ground. The radome housing 102 can be constructed from any plastic or polymeric, or other dielectric material.

Referring now to FIGS. 1 and 2A-2E collectively, in some embodiments the antenna system 100 comprises a four-port antenna (where each of four arrays are coupled to a feed) design that achieves a high-gain, omni-directional radiation pattern over a wide frequency range of operation. This antenna system 100 has dual-polarization for maximum spectral efficiency, and employs two arrays, each polarization to exploit beamforming gain. These two arrays with vertical polarization comprise a plurality of dipole antenna elements. Dipole antenna elements are connected through a corporate feed network. In various embodiments, arrays with horizontal polarization comprise slot antenna elements, which are connected through a corporate feed network.

In some embodiments, the antenna system 100 as described herein advantageously provides dual polarization (both vertical and horizontal) within a compact single package using four arrays (two vertically polarized and two horizontally polarized). Also, the antenna system 100 provides beamforming gain between two arrays of vertical polarization and two arrays of horizontal polarization. Thus, embodiments of the present technology as described herein provide uniform coverage in both vertical and horizontal polarization over 360 degrees using beamforming and polarization diversity.

In accordance with an embodiment of the present technology, the design is based on a vertical array to achieve narrow beam-width in the elevation plane, and hence high antenna gain. An omni-pattern in the azimuth is achieved by coherently combining (also known as beamforming) two 180-degree beam patterns that are pointing in opposite directions, thereby realizing beamforming gain in both transmit and receive modes of operation. A first set of two arrays is vertically polarized, each with 180 degree azimuth beamwidth. A second set of two arrays is horizontally polarized, each with 180 degree azimuth beamwidth. One example embodiment of vertical polarization employs vertically oriented dipole antennas. One example of horizontal polarization employs horizontally oriented slot antennas.

One of the advantages of the present technology is that the antenna system 100 is not frequency dependent. That is, the antenna systems described herein are as frequency independent as possible.

Figure 2A:
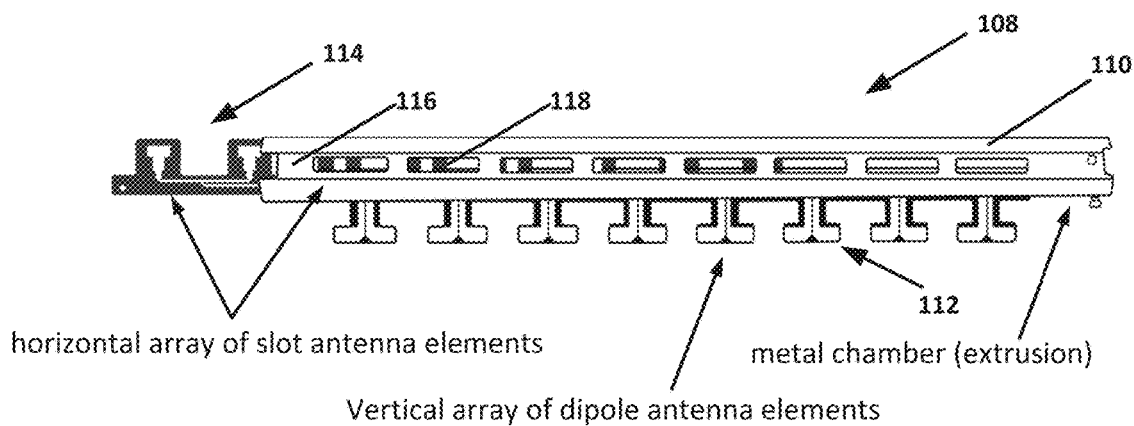
FIGS. 2A-2E collectively illustrate views of dipole element arrays and slot element arrays, as well as array assemblies comprising the same.

In an example embodiment of the present disclosure, each of the four arrays are fed using a corporate feed fabricated onto a printed circuit board to provide a wide bandwidth of operation. Turning to FIG. 2A, an example array assembly 108 comprises a metal extrusion 110, a dipole antenna element array 112, and a slot element array 114. The metal extrusion 110 is a generally tubular member having a front surface 116 with slot openings, such as slot opening 118. The dipole antenna element array 112 comprises a printed circuit board 120 having a plurality of dipole elements such as dipole element 122. Generally, the dipole element 122 comprises a body 124 and a head 126. The dipole element 122 has a T-shaped configuration in some embodiments. The body 124 and the head 126 of the dipole element 122 extend beyond an outer peripheral surface of the metal extrusion 110 when mounted to the metal extrusion 110. In some embodiments, the slot element array 114 is positioned within an interior of the metal extrusion 110 as will be discussed in greater detail with reference to FIG. 5.

Figure 2B:
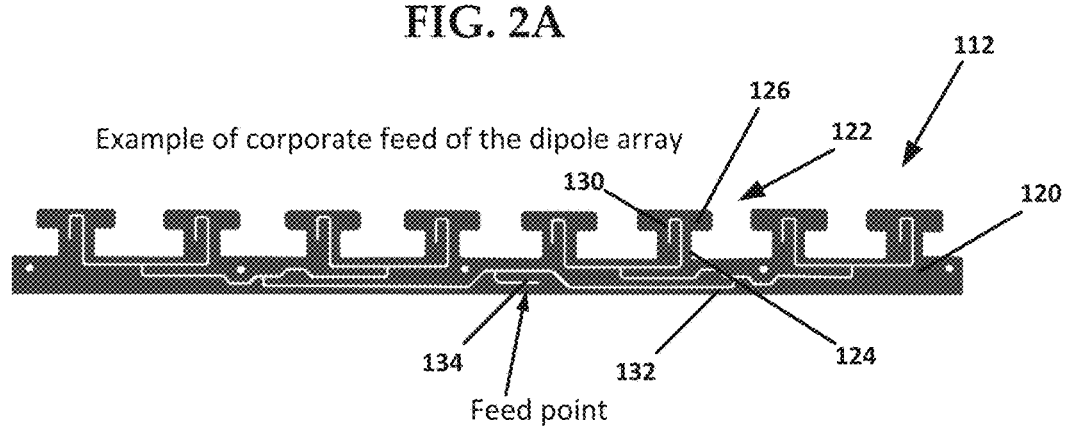

In accordance with the exemplary embodiment, arrays of the antenna system 100 are designed on a printed circuit board (PCB 120). For example, FIG. 2B illustrates the dipole antenna element array 112 formed from the PCB 120. The PCB 120 is manufactured through cutting or printing to form the dipole elements such as the dipole element 122.

FIG. 2B illustrates a rear plan view of the dipole antenna element array 112 which includes traces, such as trace 130. Each dipole element 122 is connected to a corporate feed 132 that is terminally connected to a feed point 134. Thus, each of the dipole elements is electrically coupled to the feed point 134 through the corporate feed 132. The PCB 120 can be manufactured from any suitable material that would be known to one of ordinary skill in the art.

Figure 2C:
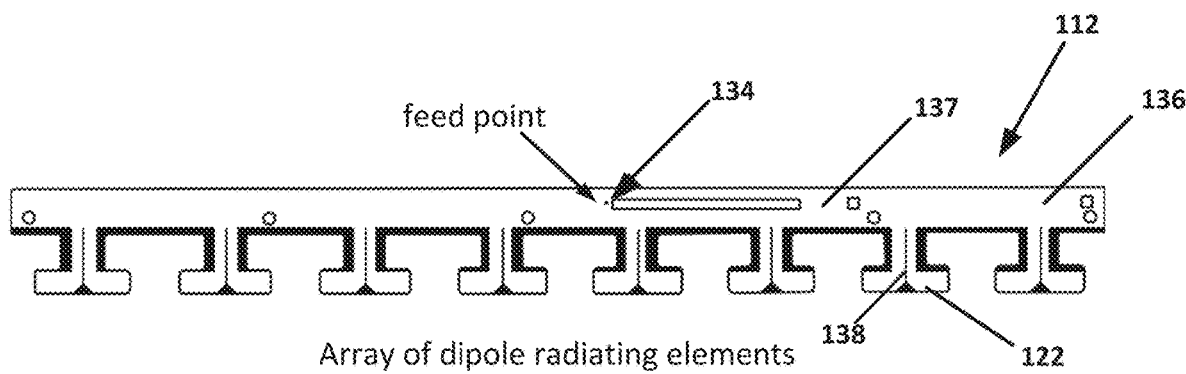

FIG. 2C illustrates a front plan view of the dipole antenna element array 112. A front surface 136 of the dipole antenna element array 112 is coated with a metallic radiating material 137 that allows the dipole elements to radiate. Each of the dipole elements such as dipole element 122 have a line of division 138 that separate two adjacent portions of metallic radiating material 137. The line of division 138 is not coated or printed with the metallic radiating material 137. To be sure, the line of division 138 separates adjacent radiating portions of each dipole element 122. The feed point 134 illustrated in FIG. 2A is also illustrated in this view.

Figure 2D:
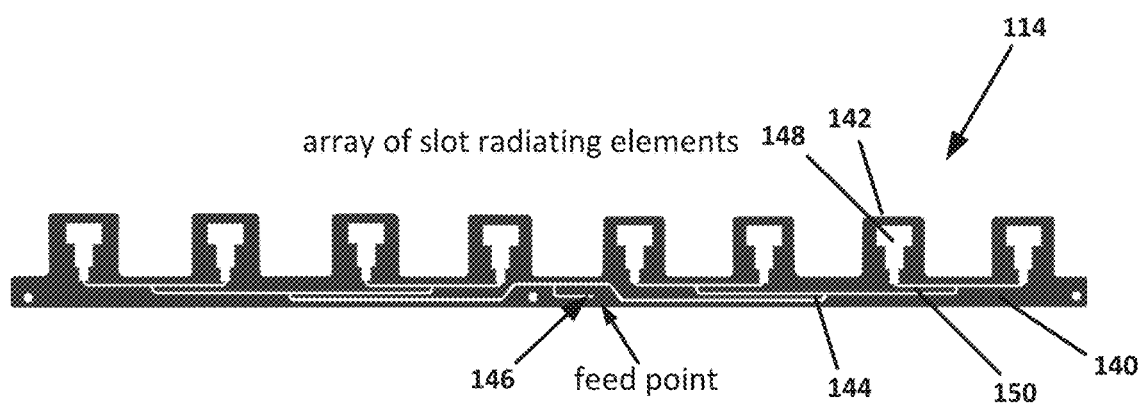

FIG. 2D is a front plan view of the slot element array 114 is a PCB 140 having a plurality of slot elements such as slot element 142. Slot elements extend as rectangular tabs that protrude from a body of the PCB 140. In one or more embodiments, the PCB 140 having slot elements forms a saw-tooth pattern.

The slot elements are electrically coupled with a corporate feed 144 that terminates at a feed point 146. The slot element 142 comprises a coating of metallic radiating material 148 that allows the slot element 142 to radiate. In some embodiments, the metallic radiating material 148 is formed to have a substantially T-shaped configuration. That is, the radiating surface of the slot element 142 has a radiating portion (e.g., metallic radiating material) that is substantially T-shaped.

In more detail, the metallic radiating material 148 is electrically coupled to a trace 150 that is in turn electrically coupled to the corporate feed 144. In various embodiments, the plurality of slot elements of the slot element array 114 align with the slot openings (such as slot element 142 aligning with slot opening 118 in FIG. 1) of the front surface 116 of the metal extrusion 110.

Figure 2E:
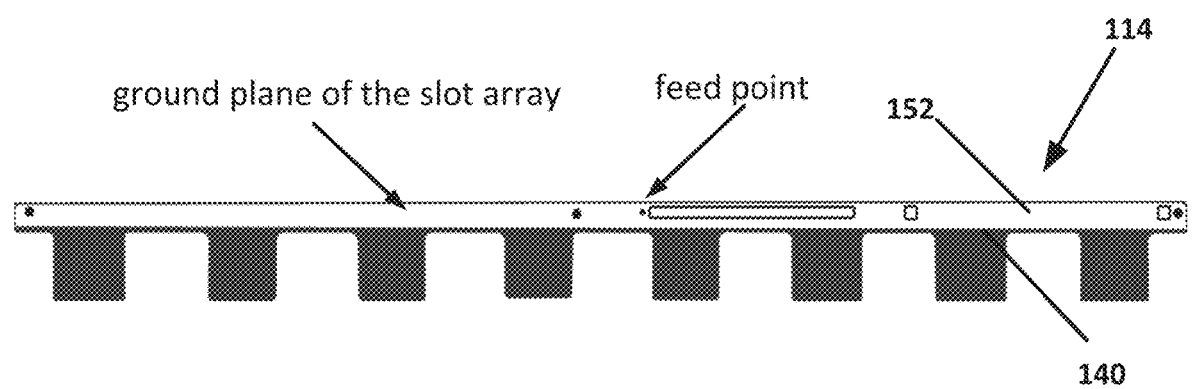

FIG. 2E is a rear plan view of a ground plane 152 of the slot element array 114. The feed point 146 is illustrated with respect to the ground plane 152. PCB 140 can be manufactured from any suitable material that would be known to one of ordinary skill in the art. In general, the metallic elements and traces provided on the PCBs 120 and 140 are created using any suitable printing process.

One exemplary embodiment of a dipole antenna array uses printed traces on a PCB, one side which routes the corporate feed, and the other side is the array of printed dipole structures with the side routing to the corporate feed. An opposing side of the dipole array has a feed point where radiation is launched by a MIMO radio and processor (see MIMO radio and processor 326 of FIG. 5). An exemplary embodiment of a slot antenna array comprises printed traces on a PCB, one side of which is the corporate feed routed to each radiating antenna element, and the other side is the ground plane, enclosed in a metal extrusion (e.g., tubular housing) with slot openings that coincide/align with the placement of the radiating antenna elements.

Figure 3:
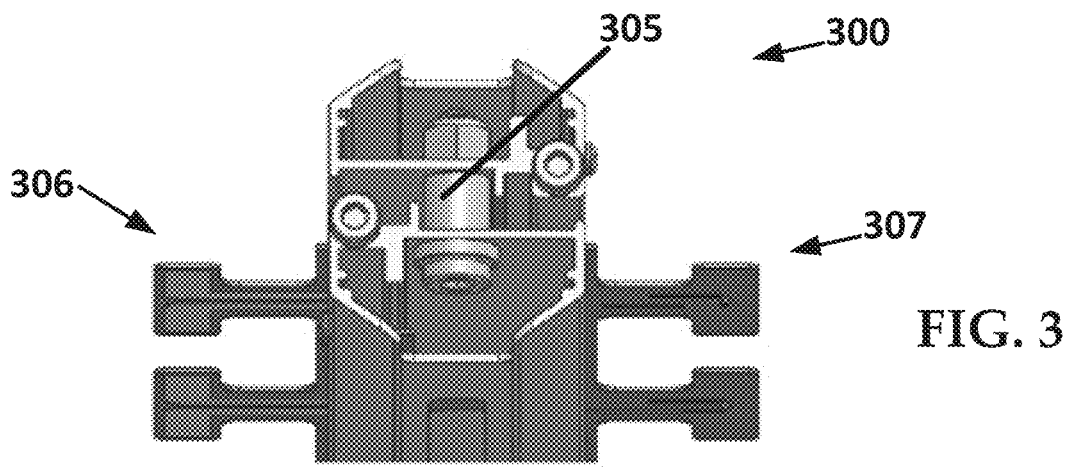
FIG. 3 is partial perspective view a core assembly of the example antenna system.
Figure 4:
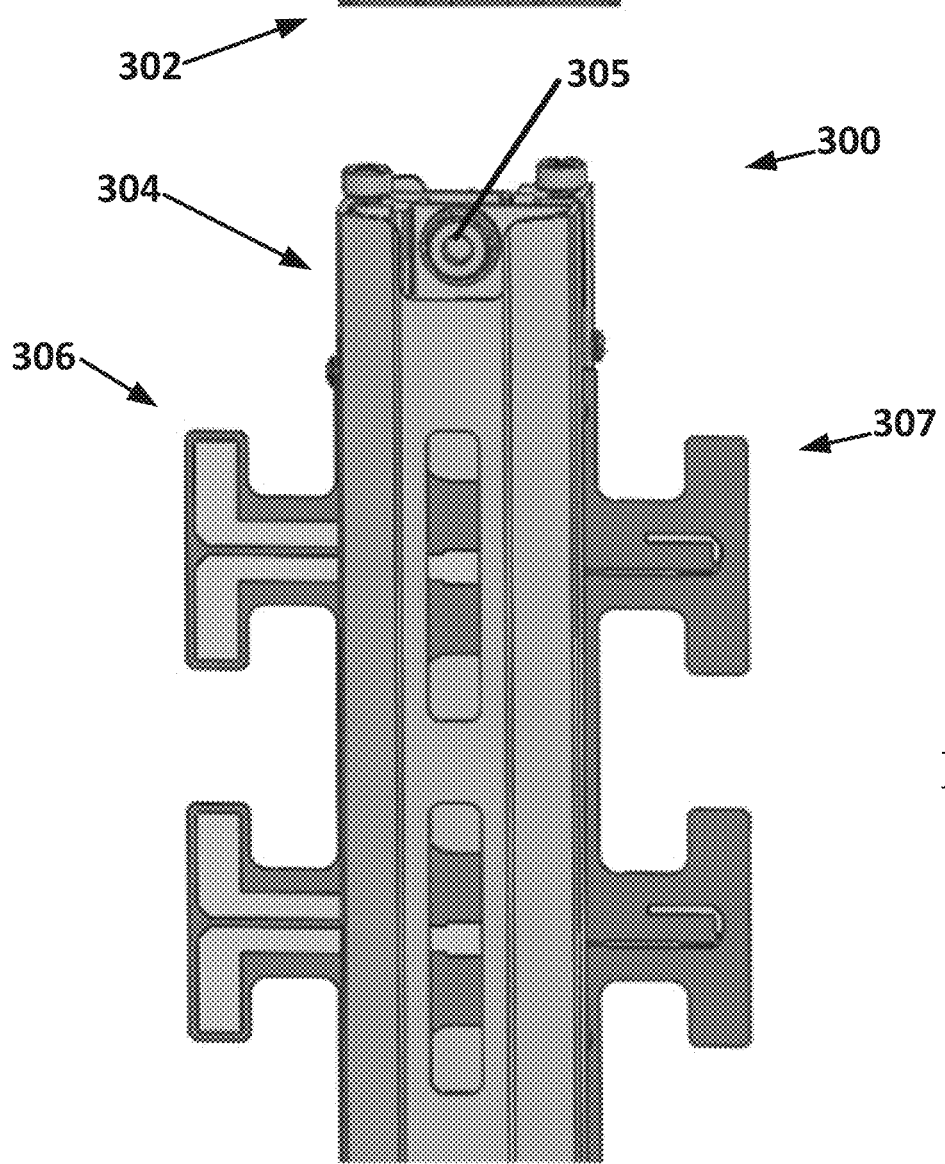
FIG. 4 is another partial perspective view a core assembly of the example antenna system.
Figure 5:
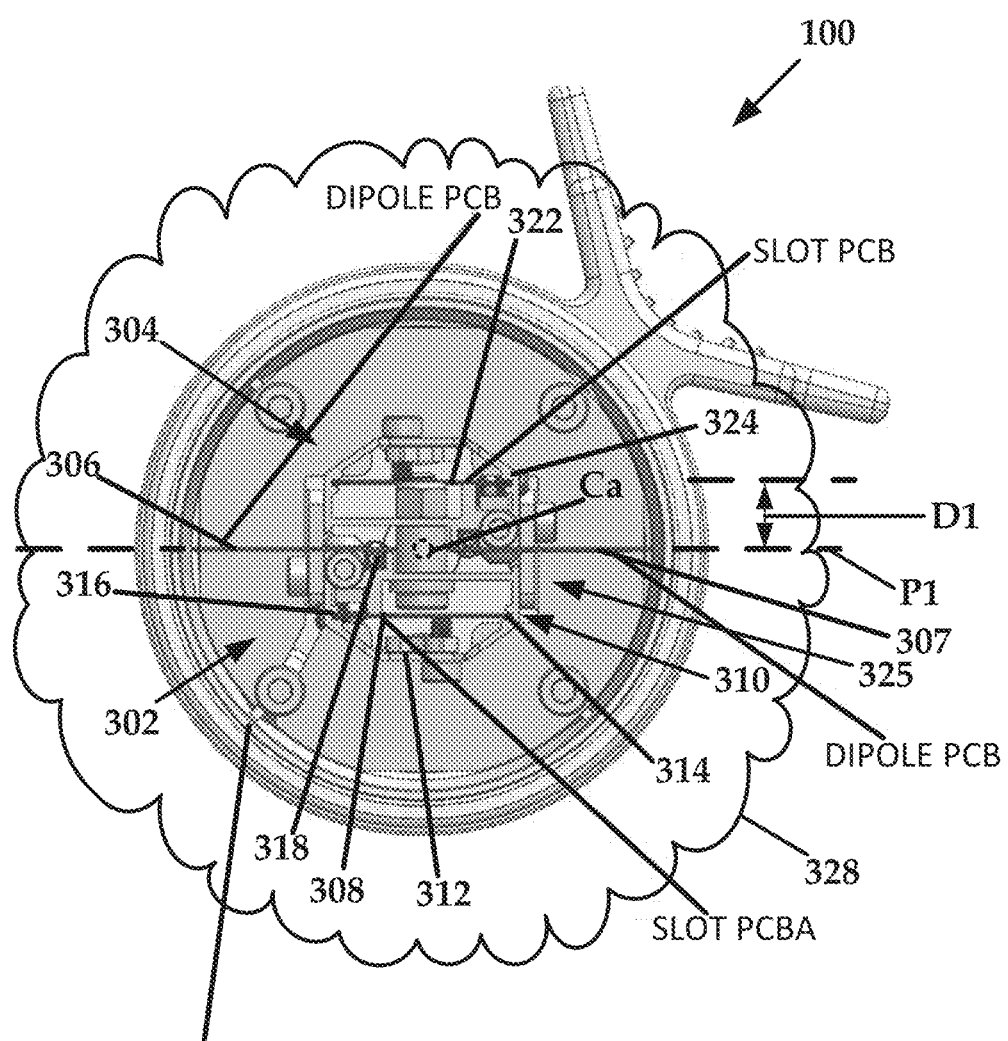
FIG. 5 is a top down view of the example antenna system illustrating a core assembly.

FIGS. 3-5 collectively illustrate a core assembly 300 having two of the array assembly 108 combined together. For purposes of clarity, a first array assembly 302 (one array assembly 108) and a second array assembly 304 (another array assembly 108) are coupled together back-to-back using fasteners, such as fastener 305.

In FIG. 4, a dipole antenna element array 306 of the first array assembly 302 is oriented such that the metallic surfaces of the dipole elements of the dipole antenna element array 306 are oriented in a first direction. Conversely, the dipole antenna element array 307 of the second array assembly 304 is oriented such that the metallic surfaces of the dipole elements of the dipole antenna element array 307 are oriented in a second direction that is opposite to the first direction. That is, the dipole antenna element array 306 and the dipole antenna element array 307 face away from one another which allows for the creation of a 180 degree beam pattern in the azimuth plane (see Ap of FIG. 1), referred to as a radiation pattern.

FIG. 5 is a top-down cross section view of the antenna system 100 that illustrates the orientation of various components. The first array assembly 302 and the second array assembly 304 are illustrated in back-to-back orientation. In the first array assembly 302, a slot element array 308 is positioned in a receiver slot 310 within the metal extrusion 312. The receiver slot 310 can include channels 314 and 316 formed into the sidewall of inner surface of the metal extrusion 312. The dipole antenna element array 306 is mounted to a rear surface 318 of the metal extrusion 312 and the dipole elements of the dipole antenna element array 306 extend outward of the metal extrusion 312.

The second array assembly 304 also comprises a slot element array 322. The second array assembly 304 is configured similarly to the first array assembly 302. Thus, the second array assembly 304 comprises a metal extrusion 324. When coupled, the metal extrusion 312 and the metal extrusion 324 form an octagonal structure.

In general, the dipole antenna element array 306 and the dipole antenna element array 307 are positioned between the metal extrusion 312 of the first array assembly 302 and the metal extrusion 324 of the second array assembly 304.

With reference to FIGS. 1-5, in operation, the antenna systems disclosed herein enable 180 degree beamwidths in an azimuth plane Ap for horizontal polarization. These 180 degree beamwidths are achieved using the first array assembly 302 and the second array assembly 304 coupled together in a center of the radome housing 102 that houses the two horizontally polarized arrays (e.g., slot element array 308 and slot element array 322).

For the vertical and horizontal polarization, the metal extrusions 312 and 324 provide isolation between a front and a back of the core assembly 300, which is how the 180 degree beamwidths are achieved. There can be a metal ground plane inside the metal chamber formed by the rear surfaces of the metal extrusion 312 and the metal extrusion 324 that acts a ground plane. 180 degree beamwidths in the azimuth plane Ap (see FIG. 1) for vertical polarization are achieved by an outer enclosure 325 formed by the metal extrusions 312 and 324.

In general, the core assembly 300 comprises two arrays of horizontally polarized radiating elements (e.g., slot element array 308 and slot element array 322). The core assembly 300 also comprises two arrays of vertically polarized radiating elements (e.g., dipole antenna element array 306 and dipole antenna element array 307) with each array having roughly 180-degree radiation pattern (see FIG. 5).

The dipole antenna element array 306 and dipole antenna element array 307 are disposed about a central axis Ca in a common horizontal plane. In some embodiments arrays of common polarization are separated by 180-degrees, such that MIMO processing of signals (such as by a MIMO processor 326) received by the arrays of common polarization results in a radiation pattern 328 that is substantially constant over 360-degrees in azimuth Ap.

In more detail, the dipole antenna element array 306 and dipole antenna element array 307 are aligned with a first plane P1. The slot element array 308 and slot element array 322 are spaced apart from and are parallel with the first plane P1. For example, slot element array 308 is spaced apart from the first plane P1 at a distance Dl. Reference lines have been illustrated for the first plane P1 and a reference for the distance Dl.

In sum, the antenna system comprises a core assembly comprising two tubular metal extrusions. The two tubular metal extrusions enclosing slot arrays 308/322 comprising a first pair of printed circuit boards each having slot elements that are horizontally polarized. The antenna system further comprises dipole arrays 306/307 comprising a second pair of printed circuit boards each having dipole elements that are vertically polarized. The slot arrays and the dipole arrays cooperatively emit a radiation pattern that is substantially constant over 360-degrees in azimuth.

Figure 6:
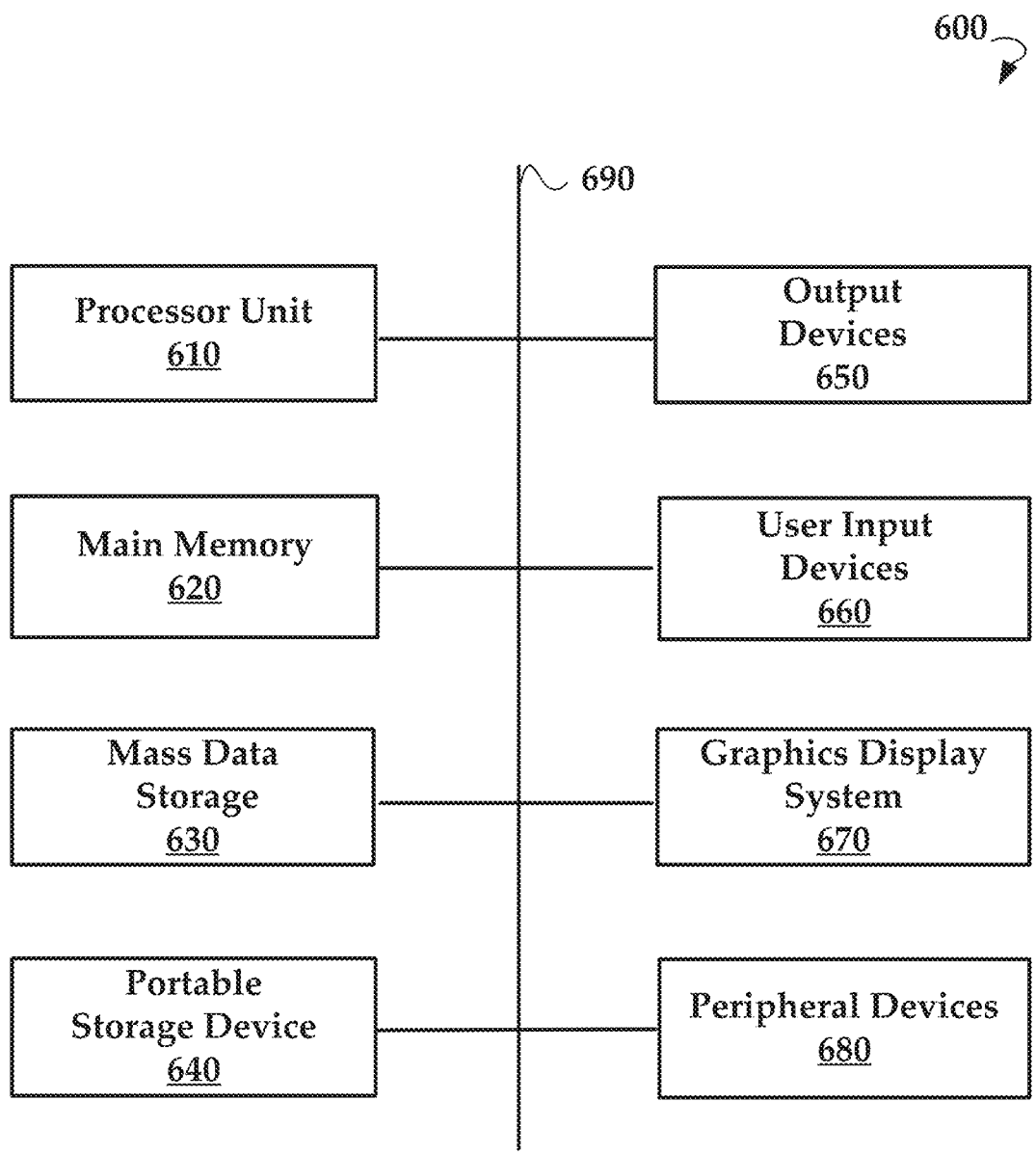
FIG. 6 illustrates an exemplary computing device that may be used to implement embodiments according to the present technology.

FIG. 6 illustrates an exemplary computer system 600 that may be used to implement some embodiments of the present invention. The computer system 600 of FIG. 6 may be implemented in the contexts of the likes of computing systems, networks, servers, or combinations thereof. The computer system 600 of FIG. 6 includes one or more processor units 610 and main memory 620. Main memory 620 stores, in part, instructions and data for execution by processor units 610. Main memory 620 stores the executable code when in operation, in this example. The computer system 600 of FIG. 6 further includes a mass data storage 630, portable storage device 640, output devices 650, user input devices 660, a graphics display system 670, and peripheral devices 680.

The components shown in FIG. 6 are depicted as being connected via a single bus 690. The components may be connected through one or more data transport means. Processor unit 610 and main memory 620 is connected via a local microprocessor bus, and the mass data storage 630, peripheral device(s) 680, portable storage device 640, and graphics display system 670 are connected via one or more input/output (I/O) buses.

Mass data storage 630, which can be implemented with a magnetic disk drive, solid state drive, or an optical disk drive, is a non-volatile storage device for storing data and instructions for use by processor unit 610. Mass data storage 630 stores the system software for implementing embodiments of the present disclosure for purposes of loading that software into main memory 620.

Portable storage device 640 operates in conjunction with a portable non-volatile storage medium, such as a flash drive, floppy disk, compact disk, digital video disc, or Universal Serial Bus (USB) storage device, to input and output data and code to and from the computer system 600 of FIG. 6. The system software for implementing embodiments of the present disclosure is stored on such a portable medium and input to the computer system 600 via the portable storage device 640.

User input devices 660 can provide a portion of a user interface. User input devices 660 may include one or more microphones, an alphanumeric keypad, such as a keyboard, for inputting alphanumeric and other information, or a pointing device, such as a mouse, a trackball, stylus, or cursor direction keys. User input devices 660 can also include a touchscreen. Additionally, the computer system 600 as shown in FIG. 6 includes output devices 650. Suitable output devices 650 include speakers, printers, network interfaces, and monitors.

Graphics display system 670 include a liquid crystal display (LCD) or other suitable display device. Graphics display system 670 is configurable to receive textual and graphical information and processes the information for output to the display device. Peripheral devices 680 may include any type of computer support device to add additional functionality to the computer system.

The components provided in the computer system 600 of FIG. 6 are those typically found in computer systems that may be suitable for use with embodiments of the present disclosure and are intended to represent a broad category of such computer components that are well known in the art. Thus, the computer system 600 of FIG. 6 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, TIZEN, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computer system 600 may be implemented as a cloud-based computing environment, such as a virtual machine operating within a computing cloud. In other embodiments, the computer system 600 may itself include a cloud-based computing environment, where the functionalities of the computer system 600 are executed in a distributed fashion. Thus, the computer system 600, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computer system 600, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. An antenna system comprising:
   two arrays of horizontally polarized radiating elements and two arrays of vertically polarized radiating elements, each array having a roughly 180-degree radiation pattern, disposed about a central axis in a common horizontal plane, arrays of common polarization separated by 180 degrees, the horizontally polarized radiating elements comprising a plurality of slot elements and the vertically polarized radiating elements comprising a plurality of dipole elements, each of the plurality of slot elements and each of the plurality of dipole elements comprising a metallic radiating material electrically coupled to a trace, the trace being electrically coupled to a corporate feed that terminates to a feed point, each of the plurality of dipole elements being electrically coupled to the feed point through the corporate feed, each of the two arrays of horizontally polarized radiating elements and each of the two arrays of vertically polarized radiating elements arrays being fed using the corporate feed; and
   at least one printed circuit board having a saw tooth pattern, the plurality of slot elements and the plurality of dipole elements being disposed on the at least one printed circuit board, the at least one printed circuit board including the corporate feed that is fabricated onto the at least one printed circuit board, wherein uniform coverage in both vertical and horizontal polarization over 360 degrees is provided using beamforming and polarization diversity.

2. The antenna system according to claim 1, wherein the antenna system is located within a housing having a mounting plate.

3. The antenna system according to claim 2, wherein the antenna system is configured to be mounted in a vertical direction against a subordinate surface using the mounting plate.

4. The antenna system according to claim 1, wherein each of the plurality of slot elements extend as rectangular tabs that protrude from a body of the at least one printed circuit board.

5. The antenna system according to claim 1, wherein each of the plurality of slot elements comprises a coating of metallic radiating material.

6. The antenna system according to claim 5, wherein the metallic radiating material is substantially T-shaped.

7. The antenna system according to claim 1, wherein the plurality of slot elements aligns with a plurality of slot openings, respectively, of a front surface of a metal extrusion.

8. The antenna system according to claim 2, wherein the housing comprises a cylindrical radome housing.

9. The antenna system according to claim 8, wherein the cylindrical radome housing comprises one of plastic, polymeric, and dielectric material.

10. The antenna system according to claim 1, wherein a radiating surface of the plurality of dipole elements comprises a line of division that separates adjacent radiating portions.

11. The antenna system according to claim 10, wherein the line of division is neither coated nor printed with the metallic radiating material.

12. A device, comprising:
a cylindrical radome housing; and
an antenna system located within the cylindrical radome housing, the antenna system comprising a core assembly comprising two tubular metal extrusions, the two tubular metal extrusions enclosing slot arrays comprising a first pair of printed circuit boards each having a plurality of slot elements that are horizontally polarized, the antenna system further comprising dipole arrays comprising a second pair of printed circuit boards each having a plurality of dipole elements that are vertically polarized, each of the plurality of slot elements and each of the plurality of dipole elements comprising a metallic radiating material electrically coupled to a trace, the trace being electrically coupled to a corporate feed that terminates to a feed point, each of the plurality of dipole elements being electrically coupled to the feed point through the corporate feed, each of the dipole arrays being fed using the corporate feed, the second pair of printed circuit boards being positioned between the two tubular metal extrusions, in order to provide uniform coverage in both vertical and horizontal polarization over 360 degrees, each circuit board of the first pair and the second pair of printed circuit boards forming a saw tooth pattern.

13. The device according to claim 12, wherein the cylindrical radome housing further comprises a base and a mounting plate.

14. The device according to claim 13, wherein the antenna system is configured to be mounted in a vertical direction against a subordinate surface using the mounting plate.

15. The device according to claim 12, wherein each of the plurality of slot elements extend as rectangular tabs that protrude from a body of at least one printed circuit board of the first pair and the second pair of printed circuit boards.

16. The device according to claim 12, wherein the metallic radiating material forms a coating for each of the plurality of slot elements.

17. The device according to claim 12, wherein the metallic radiating material is substantially T-shaped.

18. The device according to claim 12, wherein the plurality of slot elements align with slot openings of a front surface of one of the two tubular metal extrusions.

19. The device according to claim 12, wherein a side of the dipole arrays comprises the feed point.

20. The device according to claim 19, wherein radiation is launched by a MIMO radio and processor at the feed point.

* * * * *